US008268049B2

(12) United States Patent  (10) Patent No.: US 8,268,049 B2
Davydov  (45) Date of Patent: Sep. 18, 2012

(54) VAPOR-LIQUID CONTACTING APPARATUSES HAVING A SECONDARY ABSORPTION ZONE WITH VORTEX CONTACTING STAGES

(75) Inventor: Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 288 days.

(21) Appl. No.: 12/752,033

(22) Filed: Mar. 31, 2010

(65) Prior Publication Data

US 2011/0239862 A1 Oct. 6, 2011

(51) Int. Cl.
*B01D 53/14* (2006.01)
*B01D 47/06* (2006.01)
*B01D 47/12* (2006.01)

(52) U.S. Cl. ............... 95/199; 95/219; 95/223; 95/235; 95/236; 423/228; 96/314

(58) Field of Classification Search .................. 95/151, 95/156, 199, 219, 235–237; 96/303, 313–316, 96/321; 423/228, 229; 261/79.1, 116
See application file for complete search history.

(56) References Cited

U.S. PATENT DOCUMENTS

| | | | |
|---|---|---|---|
| 2,847,200 A | 8/1958 | Ung | |
| 3,989,488 A * | 11/1976 | Wisting | .......................... 96/237 |
| 4,604,988 A | 8/1986 | Rao | |
| 4,693,822 A | 9/1987 | Bowe et al. | |
| 5,024,684 A | 6/1991 | Tank | |
| 5,223,183 A | 6/1993 | Monkelbaan et al. | |
| 5,318,732 A | 6/1994 | Monkelbaan et al. | |
| 5,738,712 A | 4/1998 | Hyppanen | |
| 5,743,926 A | 4/1998 | Bannon et al. | |
| 5,837,105 A | 11/1998 | Stober et al. | |
| 6,007,055 A * | 12/1999 | Schiffner | ................... 261/79.2 |
| 6,059,934 A | 5/2000 | Stober et al. | |
| 6,682,633 B1 | 1/2004 | Xu et al. | |
| 6,918,949 B1 * | 7/2005 | Peters | ............................. 95/185 |
| 6,932,858 B2 | 8/2005 | Nicol et al. | |
| 6,984,365 B2 | 1/2006 | Nelson et al. | |
| 7,195,747 B2 | 3/2007 | Vanden et al. | |
| 7,204,477 B2 | 4/2007 | Xu et al. | |

(Continued)

FOREIGN PATENT DOCUMENTS

JP 2004130311 A 4/2004

OTHER PUBLICATIONS

Kuzmin, A.O. et al., "Vortex centrifugal bubbling reactor," Chemical Engineering Journal. 107:55-62 (2005).

*Primary Examiner* — Duane Smith
*Assistant Examiner* — Ives Wu
(74) *Attorney, Agent, or Firm* — Mark Goldberg

(57) ABSTRACT

Vapor-liquid contacting apparatuses comprising both a primary absorption zone and a secondary absorption zone comprising a plurality of vortex contacting stages are described. The apparatuses provide improved heat and mass transfer between vapor and liquid phases in processes such as absorption, to selectively solubilize contaminants (e.g., acid gases) from an impure vapor (e.g., sour natural gas). Vortex contacting stage(s) in a zone of vapor-liquid contacting, such as a secondary or finishing absorption zone, are used following bulk absorption in a primary or main absorption zone.

9 Claims, 3 Drawing Sheets

U.S. PATENT DOCUMENTS

| | | |
|---|---|---|
| 7,238,289 B2 | 7/2007 | Suddath |
| RE40,407 E | 7/2008 | Natarius |
| 7,424,999 B2 | 9/2008 | Xu et al. |
| 7,578,870 B2 | 8/2009 | Dean |
| 7,601,310 B2 | 10/2009 | Breivik |
| 8,047,509 B2 * | 11/2011 | Towler .......... 261/118 |
| 2002/0017450 A1 | 2/2002 | Csendes |
| 2008/0179766 A1 | 7/2008 | Lee et al. |

* cited by examiner

VAPOR-LIQUID CONTACTING APPARATUSES HAVING A SECONDARY ABSORPTION ZONE WITH VORTEX CONTACTING STAGES

FIELD OF THE INVENTION

The invention relates to vapor-liquid contacting apparatuses having primary and secondary absorption zones, with the secondary absorption zone comprising one or more stages of vortex contacting. The apparatuses and related methods are used to carry out vapor-liquid contacting in absorption, reaction, distillation, or other applications involving mass and/or heat transfer between vapor and liquid streams. A particular example is in the removal of acid gases (e.g., $CO_2$ and/or $H_2S$) from methane-containing gases such as natural gas.

DESCRIPTION OF RELATED ART

A significant objective throughout chemical and refining technologies is the improved efficiency of contacting between vapor and liquid phases. Currently, there are a wide variety of multi-phase reaction and separation processes which can benefit from an enhanced rate of vapor-liquid mass and/or heat transfer by increasing the interfacial area and turbulence between the contacting phases and thereby raising the mass transfer rate constant. These processes typically employ any of a wide range of conventional vapor-liquid contacting devices. Such devices include fractionation trays and packings that improve vapor-liquid contacting at a plurality of stages within a vessel. These devices may be used, for example, in selective the absorption, into the liquid phase, of impurities contained in the vapor phase. Other commercially significant applications for these contacting devices include distillation processes for separating components, into either the rising vapor phase or falling liquid phase, depending on their relative volatility.

While the overall flow between phases in selective absorption or fractional distillation columns is generally countercurrent, many types of conventional vapor-liquid contacting devices used for contacting stages within these vessels may induce localized cross flow, co-current flow, or other flow orientations between the contacting phases. Contacting stages utilizing parallel flow trays, for example, are described in U.S. Pat. Nos. 5,223,183; 5,318,732; and 7,204,477. Those utilizing co-current contacting are described, for example, in U.S. Pat. Nos. 6,682,633; 5,837,105; 6,059,934; and 7,424,999. The use of an alternative vapor-liquid contacting device, which creates a vortex centrifugal bubbling layer that achieves high interfacial area per unit volume between a vapor and a liquid is described in Kuzmin, A. O. et al., "Vortex centrifugal bubbling reactor" CHEM. ENG. JOURNAL 107: 55-62 (2005) and in Russian Patent RU 2259870.

In the art of gas processing, numerous industrial gas streams are treated to remove acid gas contaminants that would otherwise be released into the environment as harmful and polluting emissions. Acid gases that must be removed include the hydrogen halides (HCl, HBr, HF, and HI), hydrogen sulfide ($H_2S$), sulfur oxides (e.g., $SO_2$ and $SO_3$), nitrogen oxides (e.g., NO and $NO_2$), and chlorine ($Cl_2$). These acid gases originate from a wide variety of operations, for example as combustion (oxidation) products, chemical reaction byproducts, and process additive conversion products. In the case of natural gas extracted from currently developed gas fields, the valuable methane is normally contaminated with $CO_2$, $H_2S$, and other impurities. When combined with water $CO_2$ creates carbonic acid which is corrosive. This contaminant also reduces the BTU value of the gas and even renders the gas unmarketable when present in concentrations as little as 2-3% by volume. Also, $H_2S$ is an extremely toxic gas that is highly corrosive as well.

The removal of $CO_2$ and $H_2S$ from "sour" natural gas containing predominantly methane is therefore necessary to improve its quality to meet "sweet" gas standards of the purified gas for pipeline transmission, sale, and end use. Liquid solvent absorption (i.e., "wet") systems, for example, are commonly used for preferential absorption of the unwanted contaminants into physical solvents such as a dimethylethers of polyethylene glycol or chemical solvents such as alkanolamines or alkali metal salts. The solvent absorption (and also the solvent regeneration, for example, by heating in the case of a physical absorbent) are usually carried out in columns containing packing, bubble plates, or other vapor-liquid contacting devices, as discussed above, to improve the efficiency of mass transfer between phases.

Conventional natural gas purification systems are based on the absorption of contaminants into liquid absorbents or solvents, including both chemical and physical solvents. Chemical solvents react chemically with the selectively dissolved product, whereas physical solvents do not react. Physical solvents instead promote physical absorption of an impurity based on its high equilibrium solubility at its partial pressure in an impure mixture (i.e., a higher Henry's law constant). Chemical solvents include organic amines (e.g., monoethanolamine (MEA), methyldiethanolamine (MDEA), and diethanolamine (DEA)) are widely employed commercially. Physical solvents include propylene carbonate, tributyl phosphate, methanol, tetrahydrothiophene dioxide (or tetramethylene sulfone).

Conventional systems based on absorption columns having packing materials or trays, however, have a number of shortcomings, especially if located on off-shore platforms. For example, mass transfer rates between the vapor and liquid phases in these columns are relatively low, meaning that a large number theoretical equilibrium stages of contacting are required to achieve a given level of performance (e.g., vapor purity). Compactness is therefore a difficult objective. Also, the absorption of acid gases by amines is exothermic, and areas of poor flow distribution within the column can therefore cause local overheating of the solvent. This leads to losses in absorption efficiency and even boiling off of the contaminants that would otherwise be desirably absorbed into the liquid phase. Moreover, the use of tall absorption columns with their associated, large solvent inventory can be problematic on off-shore platforms where they may be subject to rocking. This is not easily addressed, for example, merely by replacing a single column with two smaller, side-by-side columns having inter-column pumping, as this alternative increases the "footprint" or construction area, which is limited and therefore costly on an off-shore platform.

Improvements in vapor-liquid contacting apparatuses, and particularly those for the treatment of natural gas to remove acid gas components, are continually being sought. Particularly desired in industry are such gas purification systems having improved efficiency of mass and heat transfer with low solvent inventory and physical space requirements.

SUMMARY OF THE INVENTION

The present invention is associated with vapor-liquid contacting apparatuses comprising one or more vortex contacting stages, particularly for improved heat and mass transfer between vapor and liquid phases in processes such as absorption, in a liquid absorbent, to selectively solubilize contaminants (e.g., acid gases) from an impure vapor. Other processes that can benefit from the vapor-liquid contacting apparatuses described herein include any of those, such as distillation, that conventionally rely on fractionation trays and packings to improve vapor-liquid contacting at a plurality of stages within a vessel.

Particular aspects of the invention are associated with the use of the vortex contacting stage(s) in a zone of vapor-liquid contacting, such as a secondary or finishing absorption zone, following a primary or main absorption zone. The vapor-liquid contacting using vortex contacting stages beneficially involves high vortical turbulence generated by vapor and/or liquid being tangentially co-injected into a vortex contacting zone. The high turbulence promotes exceptionally high mass transfer characteristics (e.g., 10-100 times improved mass transfer relative to a packed column). In the case of natural gas purification, the vortex contacting stages can provide a final removal of acid gases (e.g., from about 0.5% to about 3% by volume, in the primary absorption zone vapor outlet, down to less than 100 ppm by volume, of combined acid gases $CO_2$ and $H_2S$ in the secondary absorption zone vapor outlet). The ability to improve mass transfer advantageously allows column length to be reduced for a given performance level, or degree of acid gas removal.

A further characteristic of vortex contacting stages is a void in their central region due to the vortex effect. According to some embodiments of the invention, the secondary absorption zone comprising a plurality of vortex contacting stages, is disposed about (or surrounds) a central region through which the primary absorption zone extends. The primary absorption zone may be contained in absorption column filled with packing or containing a plurality of vapor-liquid contacting trays. The use of a column to occupy the central region of the vortex contacting stages can significantly reduce the area or footprint of the absorption system, especially since both the primary and the secondary absorption zones can be combined into a single, relatively short vessel for carrying out highly efficient vapor-liquid contacting. Furthermore, such an arrangement enables heat transfer between a primary absorption zone (e.g., comprising packing material) and a surrounding secondary absorption zone (e.g., comprising a plurality of vortex contacting stages), which helps avoid "pinch points" and minimize solvent inventory. An additional consideration is the high centrifugal acceleration values (e.g., about 20 g) attained in vortex contacting stages, such that the secondary absorption zone, containing one or more vortex contacting stages, is substantially unaffected by rocking on off-shore platforms and marine vessels.

These and other embodiments relating to the present invention are apparent from the following Detailed Description.

Figure 1:
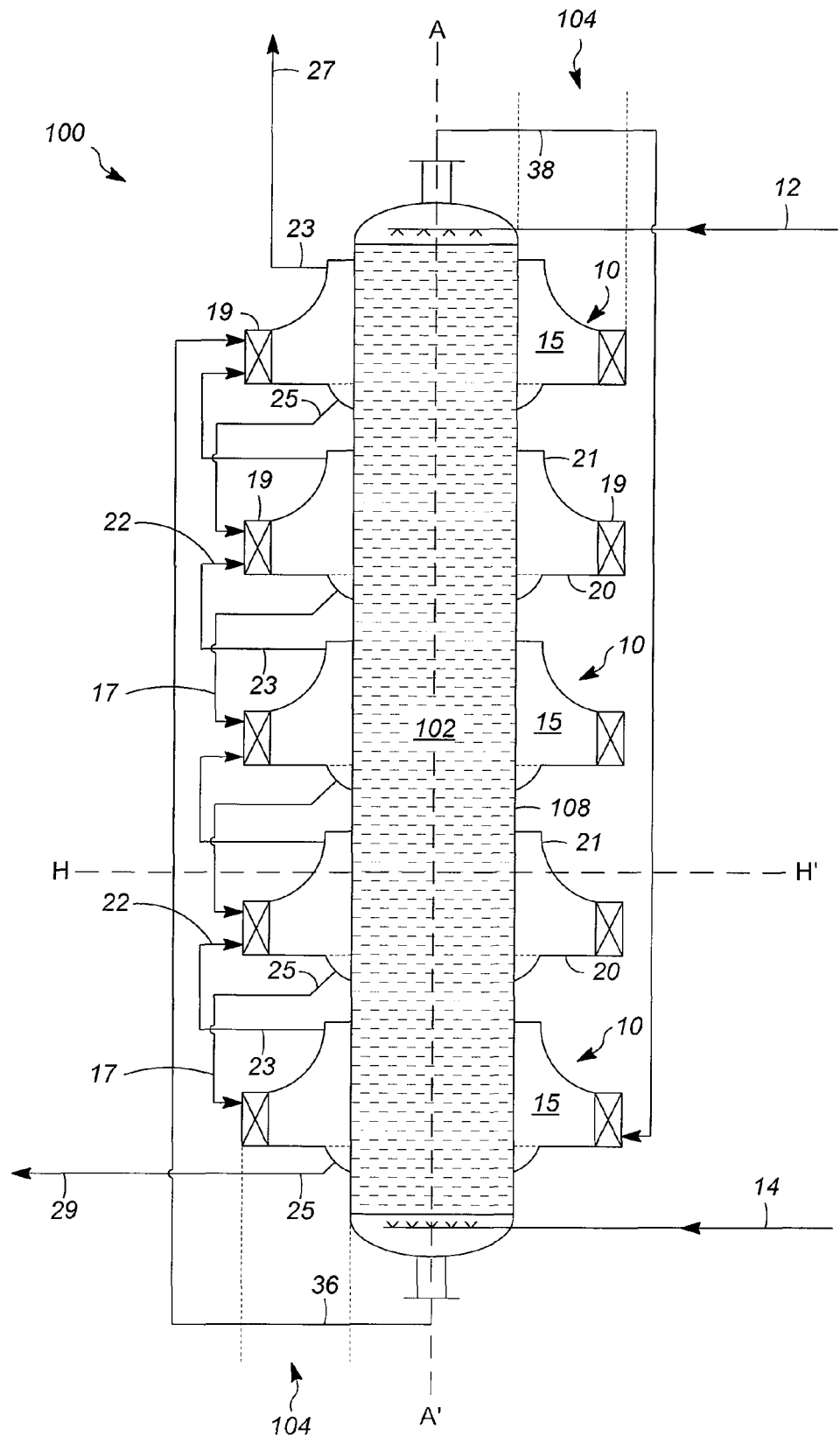
FIG. 1 is a side view of a representative vapor-liquid contacting apparatus with a secondary absorption zone comprising a plurality of vortex contacting stages surrounding a primary absorption zone.

The same reference numbers are used to illustrate the same or similar features throughout the drawings. The drawings are to be understood to present an illustration of the invention and/or principles involved. As is readily apparent to one of skill in the art having knowledge of the present disclosure, vortex contacting stages and apparatuses comprising these stages in a secondary absorption zone, according to various other embodiments of the invention will have configurations and components determined, in part, by their specific use.

DETAILED DESCRIPTION

Embodiments of the invention are directed to vapor-liquid contacting apparatuses comprising a primary absorption zone and a secondary absorption zone comprising at least one vortex contacting stage. In the absorption of contaminants, such as acid gases (e.g., $CO_2$, $H_2S$, sulfur oxides, and nitrogen oxides), from impure vapors (e.g., natural gas obtained from a gas field), the primary absorption zone can achieve the bulk or main removal of these contaminants, while the secondary absorption zone, comprising one or more vortex contacting stages, can serve as a "finishing" or "polishing" zone to more completely purify the impure vapor.

The vortex contacting stages comprise a vortex contacting zone, having a cross section with an opening (e.g., an annular cross section), such that the area of the opening corresponds to a cross section of a central region occupied by the primary absorption zone. In the case of an annular cross section, the radius of the outer circle of the annulus can generally decrease along at least a portion of axial height of the vortex contacting zone (i.e., the contacting zone may be tapered along this axial height portion). In some cases, a constant cross section of the outer circle of the annulus may be used in the top portion of the vortex contacting zone. The vortex contacting zone is defined between a bottom surface, a tapering inner surface, a tangential flow directing device disposed between the bottom and inner surfaces, an outer boundary of the primary absorption zone. The tapering inner surface is characterized in that the outer circle of the annulus decreases in diameter with increasing axial height, at least along a portion of the axial height of the vortex contacting zone. The decrease in diameter is usually not constant, such that a conical section is usually not formed. Rather the tapering inner surface is preferably curved, for example having a parabolic shape. The tangential flow directing device is generally located at or near peripheral sections of the bottom surface and the tapering inner surface and provides an inlet for vapor and liquid flows into the contacting zone, for example through guiding swirl vanes that impart a tangential flow direction. According to some embodiments, vapor may be introduced into the vortex contacting zone through the tangential flow directing device, while liquid may be introduced through a bottom surface of the contacting zone. In this case, vapor and liquid inlets are provided to the vortex contacting zone in tangential and axial directions, respectively. According to alternative embodiments, therefore, the liquid inlet to the vortex contacting zone may therefore be in fluid communication with the vortex contacting zone through the tangential flow directing device or through a bottom surface of the contacting zone. In another optional embodiment, separation of the vapor and liquid phases exiting the contacting zones may be facilitated using a vapor-liquid disengagement device.

The vapor-liquid disengagement device may comprise a circular inlet surface having an inner diameter and forming a top portion of the tapering internal surface of the vortex contacting zone. In this case, the inlet surface of the vapor-liquid disengagement device may be in fluid communication with the vortex contacting zone. An opposing, external outlet surface of the vapor-liquid disengagement device may, for example, be concentric with the inlet surface and have a larger, outer diameter. The external outlet surface, optionally in combination with other surfaces (e.g., a bottom outlet surface) of the vapor-liquid disengagement device may be used for removing separated (or disengaged) vapor and liquid streams from the contacting zone. In a representative embodiment, a disengaged vapor flows predominantly through the outlet surface opposite the inlet surface, while a disengaged liquid flows predominantly through the bottom outlet surface.

Other embodiments of the invention are directed to vapor-liquid contacting apparatuses with a secondary absorption zone comprising a plurality of the vortex contacting stages. Each of the vortex contacting stages may have the features described above. Vapor and liquid inlet and outlet conduits, such as pipes, may allow passage of fluids between the vortex contacting stages, as described in greater detail below. The secondary absorption zone may therefore comprise each of the plurality of the vortex contacting stages and their respective, individual vortex contacting zones. According to other embodiments, the secondary absorption zone may be disposed within a vertical, outer cylindrical shell of the apparatus, with fluids passing to and from the vortex contacting stages within the boundary of an outer cylindrical shell and using flow guiding structures within the secondary absorption zone, as described in greater detail below. In either of these embodiments, the secondary absorption zone is external to an outer boundary (e.g., a cylindrical vessel wall or surface) of the primary absorption zone, which extends through a central region (e.g., as a packed column). Therefore, cross sections (e.g., circular cross sections of an inner column) of the primary absorption zone can be within the annular cross sections of the contacting zones of the plurality of vortex contacting stages. In addition to vapor and liquid inlets, the vortex contacting stages also have vapor and liquid outlets, and the liquid and vapor inlets and outlets to the contacting zones may also be referred to as "vapor zone inlets," "liquid zone inlets," "vapor zone outlets," and "liquid zone outlets," if necessary to better distinguish these inter-stage inlets and outlets of the contacting stages from feed inlets and product outlets of the vapor-liquid contacting apparatus as a whole.

The vapor outlet of a vortex contacting stage may be in fluid communication with a vapor inlet of a superior contacting stage (e.g., at a higher axial position in the secondary absorption zone). Otherwise, in the case of a top vortex contacting stage in an upper section of the secondary absorption zone (e.g., the highest contacting stage), the vapor outlet may be in communication with a vapor product outlet of the apparatus, for example used to convey purified vapor exiting the apparatus. Conversely, the liquid outlet of a vortex contacting stage may be in fluid communication with a liquid inlet of an inferior contacting stage (e.g., at a lower axial position in the secondary absorption zone). Otherwise, in the case of a bottom vortex contacting stage in a lower section of the secondary absorption zone (e.g., at the lowest contacting stage), the liquid outlet may be in communication with a liquid product outlet of the apparatus, for example used to convey spent absorbent (solvent) exiting the apparatus. In the case of multiple vortex contacting stages having vapor-liquid disengagement devices, the outlet surfaces of the vapor-liquid disengagement device of one vortex contacting stage may be in fluid communication with both a vapor inlet of an immediately superior (higher) contacting stage and a liquid inlet of an immediately inferior (lower) contacting stage. Communication with the liquid inlet may be provided along a flow path defined by a curved outer surface, opposing the tapering inner surface defining the contacting zone. Regardless of whether vapor-liquid disengagement devices are used, communication of vapors and liquids between vortex contacting stages may be provided using vapor riser and liquid downcomer conduits. For example, in the case of a liquid flow path defined by a curved outer surface, as noted above, this curved surface may terminate at one or more liquid downcomers conveying liquid downward from a superior vortex contacting stage to an inferior vortex contacting stage.

In an embodiment which helps maintain stable vortex formation during operation, improves liquid handling capacity, simplifies construction, and reduces cost, liquid downcomer segments may extend in discreet sections of an outer annular space, external to and normally surrounding the plurality of vortex contacting stages. Advantageously, the segments may be disposed radially between other liquid downcomer segments of immediately inferior and/or immediately inferior vortex contacting stages. To further improve the mechanical integrity and reduce stresses on the multi-stage apparatuses described herein, the tangential flow directing devices of successive contacting stages may be arranged to swirl inlet vapors in alternating, clockwise/counterclockwise directions, so that the vortex spin direction is reversed in an alternating manner.

Further embodiments of the invention are directed to vapor-liquid contacting apparatuses comprising a primary absorption zone and a secondary absorption zone comprising a plurality of vortex contacting stages. Each stage has a vapor-liquid disengagement device having outlet surfaces in fluid communication with both a vapor inlet of an immediately superior vortex contacting stage and a liquid downcomer in fluid communication with a liquid inlet of an immediately inferior vortex contacting stage.

In apparatuses described herein, the vortex contacting stages in the secondary absorption zone may be used to carry out secondary vapor-liquid contacting, following primary vapor-liquid contacting in a primary absorption zone extending through a central region, about which the vortex contacting stages of the secondary absorption zone are disposed. This manner of vapor-liquid contacting may be used in any application in which contacting with high interfacial area for mass transfer, efficient phase disengagement after contacting, good performance over a broad range of vapor: liquid flow ratios and absolute flow rates, low pressure drop, and simplified fabrication are desired. The apparatuses may therefore be used as absorbers, reactors, distillation columns, strippers, etc. In a representative embodiment, the apparatuses having dual contacting zones including a secondary contacting zone comprising a plurality of vortex contacting stages, are used in the absorption of contaminants such as acid gases and other contaminants from vapor streams.

Aspects of the invention are therefore associated with the discovery of vapor-liquid contacting apparatuses having a number of advantages, as discussed above, in terms of their performance as well as their compactness. The cut-out, side view of FIG. 1 generally illustrates liquid and vapor flows to, within, and from a representative vapor-liquid contacting apparatus 100. A primary absorption zone 102 is in the form of an internal absorption column and comprises, for example packing material or a plurality of trays to improve the efficiency of vapor-liquid contacting in this zone. Primary absorption zone 102 and secondary absorption zone 104, comprising a plurality of vortex contacting stages 10, can have a common vertical axis A-A', or at least vertical axes that extend through both of these zones 102, 104 (e.g., through their common central region), even if the zones 102, 104 do not necessarily having the same height. In the case of secondary absorption zone, this common axis A-A' extends through the annular space in the center of this zone and in particular through the centers of concentric circles of the annular cross sections of vortex contacting zones 10. As shown in FIG. 1, common vertical axis A-A' is thus a vertical axis of both (i) an inner vertically oriented vessel 108 containing primary absorption zone 102, and (ii) secondary absorption zone 104 comprising the plurality of vortex contacting stages 10. If an outer vertically oriented vessel (not shown in FIG. 1, but shown as 106 in FIGS. 2-4) is used to contain secondary absorption zone 104, then common vertical axis A-A' may also be common to the axis of this outer vertically oriented vessel.

FIG. 1 therefore illustrates a vapor-liquid contacting apparatus in which a primary absorption zone 102 (e.g., a column) is fitted into a series (or stack) of vortex contacting stages 10 (e.g., vortex contactors). The contacting stages 10 may be fitted to the outer boundary, for example as defined by inner vertically oriented vessel 108, containing primary absorption zone 102.

Primary absorption zone 102 extends through a central region about which the plurality of vortex contacting stages 10 and their respective vortex contacting zones 15 are disposed. Although FIG. 1 depicts five contacting stages 10, a smaller or larger number may be used, depending on the specific application and desired performance criteria. Secondary absorption zone 104 comprises the plurality of vortex contacting stages 10 and their respective vortex contacting zones 15. At a given axial height H-H' corresponding to that of any vortex contacting stage 10, vortex contacting zone 15 has an annular cross section. The outer circle of the annulus can generally decrease in diameter (although usually not in a constant manner, in order to provide a curved, rather than conical surface), with increasing axial height, along a tapered portion of the vortex contacting zone 15. The primary absorption zone 102 has a circular cross section within this annular cross section of vortex contacting zone 15 at axial height H-H' (i.e., the primary absorption zone 102 extends through a central region, with the vortex contacting stages 10 and vortex contacting zones 15 being disposed about region).

In addition to vortex contacting zone 15, each vortex contacting stage 10 also has a vapor inlet 22 in fluid communication with vortex contacting zone 15 through a tangential flow directing device 19. As shown in FIG. 1, a liquid inlet 17 of each vortex contacting stage 10 is also in fluid communication with vortex contacting zone 15 through tangential flow directing device 19. In vortex contacting zone 15, a spinning vortex of a highly dispersed vapor-liquid mixture can be produced and held in a field of centrifugal forces. In particular, the vortex is created in vortex contacting zone 15 when vapor and liquid enter through vapor and liquid inlets 22, 17. A circular rotation of the entering vapor, with a rotational axis that substantially coincides with the axis of the primary and secondary absorption zones 102, 104, is established with tangential flow directing device 19, for example, having guiding vanes.

Vortex contacting zone 15 has an annular cross section, with the outer diameter of the annulus, at axial heights above bottom surface 20 of the vortex contacting stage 10, being either the distance across tangential flow directing device 19 (e.g., its inner diameter) or the distance across the opening defined by tapering inner surface 21. The cross sectional diameter of vortex contacting zone 15 can therefore generally decrease from bottom to top in the vortex contacting stage 10 depicted in FIG. 1. Vortex contacting zone 15 is defined between bottom surface 20, tapering inner surface 21, tangential flow directing device 19, and an outer boundary (e.g., a cylindrical vessel wall or surface of inner vertically oriented vessel 108) of primary absorption zone 102. Tangential flow directing device 19 is disposed between bottom and tapering inner surfaces 20, 21 and proximate peripheral sections (i.e., removed from the axial center of the contacting zone 15) of these surfaces. Circulating vapor can therefore exit vortex contacting zone 15 through a contacting zone opening or vapor outlet 23 which is normally at or near the top of vortex contacting stage 10 where the cross sectional diameter of vortex contacting zone 15 (or diameter of the outer circle of the annular cross section) is generally the smallest.

For all but the top vortex contacting stage shown in FIG. 1, vapor outlet 23 is in fluid communication with a vapor inlet 22 of a superior vortex contacting stage (i.e., at a greater axial height). Similarly, for all but the bottom vortex contacting stage shown in FIG. 1, a liquid outlet 25 is in fluid communication with a liquid inlet 17 of an inferior vortex contacting stage (i.e., at a lower axial height). In the case of the top vortex contacting stage, vapor outlet 23 is in communication with vapor product outlet 27 exiting vapor-liquid contacting apparatus 100 and used for conveying, for example, purified vapor (e.g., having a reduced concentration of undesired contaminants). In the case of the bottom vortex contacting stage, liquid outlet 25 is in communication with liquid product outlet 29 exiting the vapor-liquid contacting apparatus 100 and used for conveying, for example, spent absorbent (solvent) following the absorption of contaminants.

In addition to vapor product outlet 27 and liquid product outlet 29 for conveying net products from the vapor-liquid contacting apparatus 100, vapor feed inlet 14 and liquid feed inlet 12 are used to convey vapor and liquid feeds to the apparatus for contacting. As illustrated in the embodiment shown in FIG. 1, vapor feed inlet 14 and primary absorption zone liquid outlet 36 communicate with a lower section (e.g., the bottom) of primary absorption zone 102. That is, feed vapor enters the apparatus at this lower section, and primary absorption zone liquid is removed from the primary absorption zone at this lower section. Primary absorption zone liquid outlet 36 also communicates with an upper section (e.g., a top vortex contacting stage) of the secondary absorption zone 104, in order to convey primary absorption zone liquid effluent from a lower section of the primary absorption zone to an upper section of the secondary absorption zone.

As also illustrated in the embodiment of FIG. 1, liquid feed inlet 12 and primary absorption zone vapor outlet 38 communicate with an upper section (e.g., the top) of primary absorption zone 102. That is, feed liquid enters the apparatus at this upper section, and primary absorption zone vapor is removed from the primary absorption zone at this upper section. Primary absorption zone vapor outlet 38 also communicates with a lower section (e.g., a bottom vortex contacting stage) of the secondary absorption zone 104, in order to convey primary absorption zone vapor effluent from an upper section of the primary absorption zone to a lower section of the secondary absorption zone.

Representative methods for contacting a vapor and a liquid therefore comprise feeding an impure vapor, through vapor feed inlet 14, and feeding a liquid, through liquid feed inlet 12, to a vapor-liquid contacting apparatus as described herein, and exemplified in FIG. 1. A representative impure vapor comprises predominantly light hydrocarbons (e.g., $C_1$-$C_3$ hydrocarbons such as methane), and non-hydrocarbon gas contaminants, such as carbon dioxide ($CO_2$) and hydrogen sulfide ($H_2S$). Examples of such gas streams include natural gas and coalbed methane, which comprise predominantly methane (e.g., in an amount generally greater than about 50% by volume, typically greater than about 80% by volume, and often greater than about 90% by volume) and also comprise the acid gases $CO_2$ and $H_2S$ in a combined amount from about 1% to about 10% by volume. Due to the highly efficient mixing in the vortex contacting stages of the secondary absorption zone, the reduction in selectively absorbed (dissolved) contaminants in the purified vapor exiting the vapor-liquid contacting apparatus, through the vapor product outlet, can be substantial. For example, the combined amount of acid gases $CO_2$ and $H_2S$ in the purified vapor, after having been passed through both primary and secondary absorption zones, may be generally less than about 1000 ppm, typically less than about 500 ppm, and often less than about 50 ppm, by volume. It will be appreciated that the invention is broadly applicable to the purification of impure gas feeds in which a contaminant, present in a minor amount, is preferentially absorbed into a liquid absorbent or solvent, and particularly a chemical solvent.

A representative liquid feed is a fresh absorbent or solvent, optionally combined with recycle absorbent according to some embodiments. Examples of absorbents that are particularly effective as chemical solvents for removing acid gases include organic amines and particularly alkanolamines (e.g., monoethanolamine (MEA), methyldiethanolamine (MDEA), and diethanolamine (DEA)). In an exemplary embodiment, the impure vapor and fresh (or combined fresh/recycle) absorbent are fed, respectively, to lower and upper sections of the primary absorption zone 102 for countercurrent contacting of rising vapor against falling liquid. Downward liquid flow induced, for example, by gravity may be a trickle flow within primary absorption zone 102. The liquid and vapor are contacted in both primary absorption zone 102 and then secondary absorption zone 104 in a manner such that overall flows of vapor and liquid are countercurrent. A purified vapor is removed through vapor product outlet 27 and spent absorbent is removed through liquid product outlet 29.

Other process features associated with the embodiment of a vapor-liquid contacting apparatus shown in FIG. 1 include removing a primary absorption zone vapor effluent from an upper section of the primary absorption zone and also removing a primary absorption zone liquid effluent from a lower section of the primary absorption zone. The primary absorption zone vapor effluent is then passed or conveyed, through primary absorption zone vapor outlet 38, from the upper section of the primary absorption zone 102 to a lower section (e.g., a bottom vortex contacting stage) of the secondary absorption zone 104. Also, the primary absorption zone liquid effluent is passed or conveyed, through primary absorption zone liquid outlet 36, from the lower section of the primary absorption zone 102 to an upper section (e.g., a top vortex contacting stage) of the secondary absorption zone 102. Conveying of the liquid from a lower section to an upper section may be aided using an absorbent liquid pump (not shown). Purified vapor and spent absorbent are removed, respectively, from an upper section (e.g., a top vortex contacting stage) and a lower section (e.g., a bottom vortex contacting stage) of the secondary absorption zone 104.

A number of variations of vapor-liquid contacting methods utilizing a secondary absorption zone comprising vortex contacting stages are within the scope of the present invention and will be recognized by those skilled in the art, having knowledge of the present disclosure. For example, the primary and/or secondary absorption zone(s) may be operated as co-current contacting zones, with overall vapor and liquid flows in the same direction (i.e., either both upward or both downward), rather than as counter-current contacting zones. According to other alternative embodiments, a flow of fresh absorbent or solvent, as a liquid feed, may be split between the primary and secondary absorption zones, such that the zones operate in parallel with respect to the liquid phase and in series with respect to the vapor phase. Further embodiments include those utilizing gas recompression following the primary absorption zone to more efficiently drive the vortex contacting stages in the secondary absorption zone (e.g., by inducing greater turbulence to improve mixing). Still further alternative embodiments can include a step of flashing the partially spent absorbent after exiting the primary absorption zone. Combinations of these variations are also possible.

Figure 2:
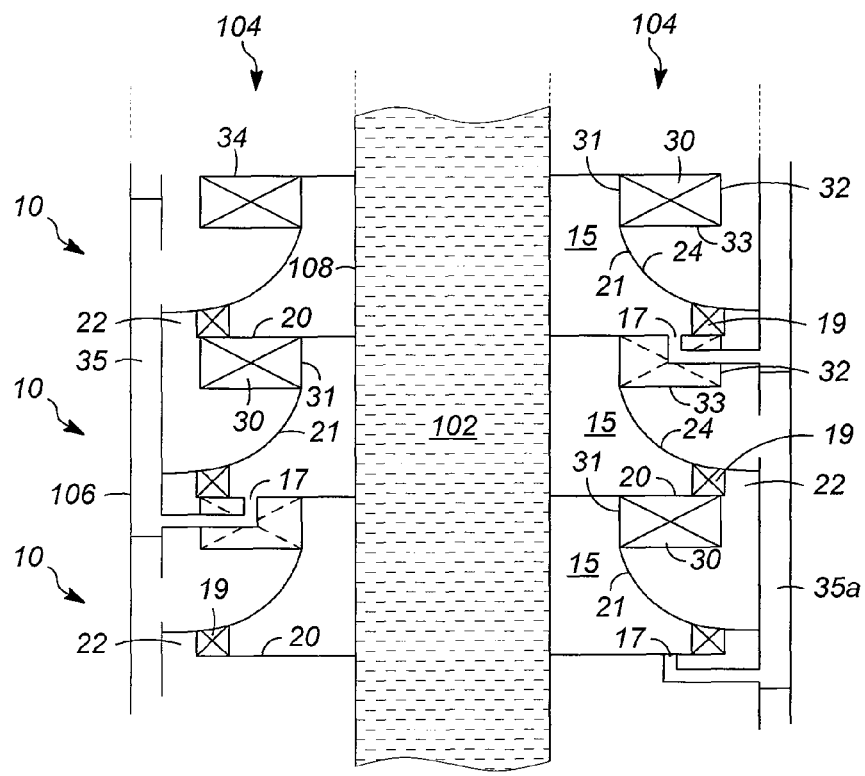
FIG. 2 is a side view of a section of a vapor-liquid contacting apparatus having vapor-liquid disengagement devices to improve the efficiency of separation of the vapor and liquid phases exiting each of the vortex contacting stages.
Figure 3:
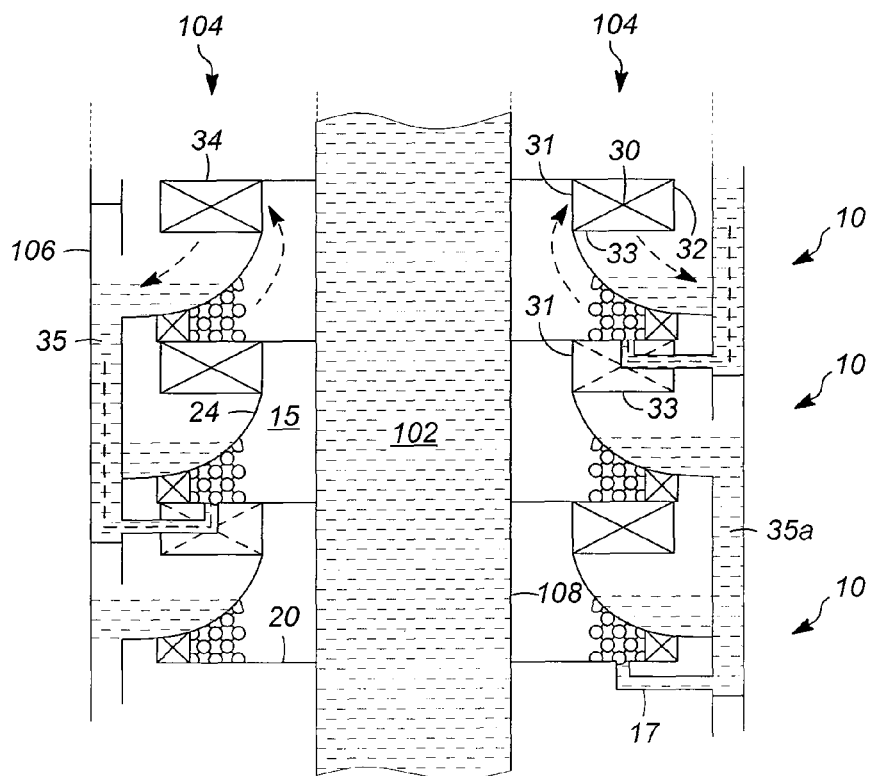
FIG. 3 shows liquid flows through the vapor-liquid contacting apparatus of FIG. 2.
Figure 4:
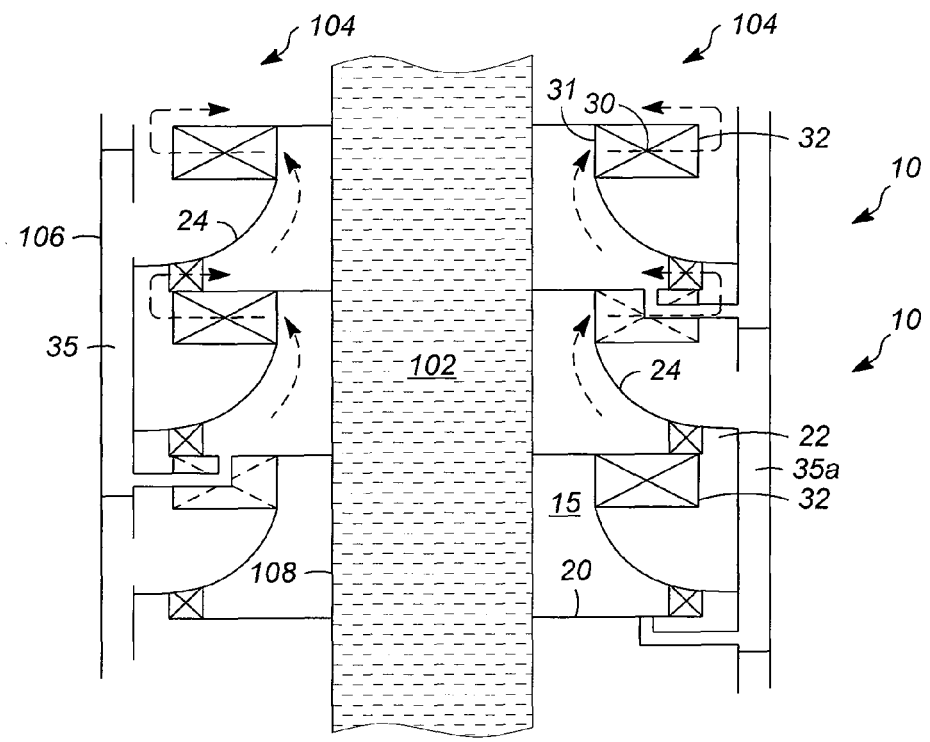
FIG. 4 shows vapor flows through the vapor-liquid contacting apparatus of FIG. 2.

Particular vapor and liquid flow configurations through the secondary absorption zone 104, according to other exemplary embodiments of the invention, are shown in FIGS. 2-4. In these embodiments, vortex contacting zones 15 are open, along vapor and liquid flow paths between vortex contacting stages, to a wall or shell of an outer vertically oriented vessel 106, which is used to contain secondary absorption zone 104. As in FIG. 1, each vortex contacting zone 15 is defined between bottom surface 20, tapering inner surface 21, tangential flow directing device 19, and an outer boundary (e.g., a cylindrical vessel wall or surface of inner vertically oriented vessel 108) of the primary absorption zone 102. Each vortex contacting zone also has an associated vapor inlet 22 and liquid inlet 17. In FIGS. 2-4, however, liquid enters vortex contacting zone 15, in a generally axial flow direction, through liquid inlet 17 in communication with vortex contacting zone 15 through bottom surface 20. Liquid inlet 17 is closer to the vertical axis of vortex contacting zone 15 (or vertical axis of a vessel containing the contacting stage 10) than tangential flow directing device 19.

Another feature of the specific embodiment depicted in FIGS. 2-4 is the presence, in each vortex contacting stage 10, of a vapor-liquid disengagement device 30, having an inlet surface 31 that forms a top portion of the tapering inner surface 21. This inlet surface 31 of the vapor-liquid disengagement device 30 is in fluid communication with vortex contacting zone 15. Vapor-liquid disengagement device 30, like tangential flow directing device 19, may therefore be ring-shaped. In the embodiment illustrated in FIGS. 2-4, the inlet (or internal) surface 31 of the ring provides the smallest diameter at the top of vortex contacting zone 15, such that the top portion of the tapering internal surface 21, provided by the vapor-liquid disengagement device 30, is a portion of constant diameter.

In FIGS. 2-4, therefore, fluids are diverted in a radial direction through inlet surface 31 of vapor-liquid disengagement device 30. Physical separating structures, such as demisters in the form of concentric plates (or disengagement plates), in vapor-liquid disengagement device 30 greatly benefit the separation of vapor and liquid streams after their contact, relative to the reliance on centrifugal force and gravity alone to accomplish the desired separation. In particular, the exiting fluids forced through inlet surface 31 must contact the physical separating structures before emerging through outlet surfaces 32, 33 as separated or disengaged vapor and liquid streams. Effective phase disengagement is provided in a relatively compact space.

One of the outlet surfaces of vapor-liquid disengagement device 30 is external outlet surface 32 that is concentric with inlet surface 31 and has the larger diameter of ring-shaped vapor-liquid disengagement device 30. Below external outlet surface 32 is bottom outlet surface 33 of vapor-liquid disengagement device 30. Fluid passage through inlet surface 31, external outlet surface 32, and bottom outlet surface 33 of vapor-liquid disengagement device 30 may be accomplished if these surfaces are at least partially open, for example by using perforated plates at these surfaces. In contrast, top surface 34 may be imperforate in order to prevent fluid from exiting vapor-liquid disengagement device 30 in the absence of significant contact with its physical separating structures. Also, while two separate outlet surfaces 32, 33 are illustrated in FIGS. 2-4, it is understood that only a single outlet surface may be required in other embodiments. For example, the corner junction between external outlet surface 32 and bottom outlet surface 33 may be curved, such that separate outlet surfaces 32, 33 are no longer distinguishable.

Therefore, rather than relying on centrifugal forces alone to disengage vapor and liquid exiting the contacting zone, quantities undesirable entrained fluids, and particularly of entrained vapor in the disengaged liquid, are significantly reduced through the use of a vapor-liquid disengagement device 30, as shown, for example, in the vortex contacting stages 10 of the secondary absorption zone 104, according to the embodiment illustrated in FIGS. 2-4. An example of a suitable physical separating structure for use in a vapor-liquid disengagement device includes a plurality of radially stacked plates. The disengagement device can be arranged so that the plates are stacked radially such that fluid (e.g., containing both vapor and liquid fractions) exiting a vortex contacting zone 15 flows radially outward between the stacked plates which provide surfaces and induce complexities in the fluid flow path that result in effective vapor-liquid disengagement. In one embodiment, therefore, the vapor-liquid disengagement device 30 comprises a plurality of plates in the shape of rings. These plates may be maintained in a radial arrangement about the top of the vortex contacting zone 15, with the inner diameter of the plates forming at least part of the inlet surface of the vapor-liquid disengagement device 30.

A number of suitable separating structures for use in the vapor-liquid disengagement device are possible. These structures include, for example, mist eliminators, such as a vane type demisters having various channels and louvers such that fluid passing through the demister must undergo several changes in direction which cause any entrained liquid droplets to impact portions of the separating structure and flow downward to the bottom of the demister. Another example of known vapor-liquid separating structures are mesh pads or woven threads. Combinations of these mist eliminator technologies can also be used. Various separating (or separation) structures for demisters, perforated and imperforate plates that cooperate with these structures, as well as the orientation of these structures and plates, are described in detail, for example, in U.S. Pat. No. 7,424,999 at column 7, lines 16 to 64 and at column 9, line 61 to column 11, line 30, this subject matter being incorporated by reference into the present disclosure.

According to the embodiment illustrated in FIGS. 2-4, after exiting vortex contacting zone 15, the vapor volume is expanded toward the full diameter of outer vertically oriented vessel 106 (but possibly excluding an annular, liquid downcomer section, if used). The centrifugal force of the circulating vapor directs any liquid carried with the vapor exiting vortex contacting zone 15 to the vessel periphery, such that vapor-liquid disengagement can occur in a space of expanded diameter. The disengaged liquid can then flow in the downward direction across a curved outer surface 24 that is external to vortex contacting zone 15 and opposes the tapering inner surface 21. The inner and opposing outer surfaces 21, 24 are generally smooth and capable of maintaining a stable, spinning vortex in contacting zone 15. The inner and opposing outer surfaces are generally curved, although straight surfaces, such as a tapering inner surface that tapers diagonally along a straight line, and/or a straight, diagonal opposing outer surface, are also possible. Swirling flow may be enhanced using additional elements such as central blade rotator (not shown), although such elements are optional.

The flows of liquid and vapor phases, through the vortex contacting zones 15 in the secondary absorption zone 104, are more clearly illustrated in FIGS. 3 and 4, respectively. As shown in FIG. 3, liquid exits vortex contacting zones 15 of each vortex contacting stage 10 through respective inlet surfaces 31 of vapor-liquid disengagement devices 30. The disengaged liquid emerges predominantly through bottom outlet surfaces 33 which are in communication with curved outer surfaces 24 external to vortex contacting zones 15 and opposing tapering inner surfaces 21. The disengaged liquid therefore drains down curved outer surfaces 24, above which is sufficient space for additional disengagement of any vapor bubbles remaining in this liquid. The liquid flow path is further defined in FIG. 3 by liquid downcomers 35 at which curved outer surfaces 24 terminate. Liquid downcomers 35 are in fluid communication with liquid inlets 17 of the respective, immediately inferior or lower vortex contacting stages. In particular, liquid downcomers 35 direct disengaged liquid exiting a vortex contacting stage, through bottom outlet surfaces 33 of vapor-liquid disengagement devices 30, to these liquid inlets 17. As illustrated in FIGS. 2-5, the liquid downcomers 35 of a given vortex contacting stage can all extend in annular spaces about (or external to) their respective immediately inferior vortex contacting stages. These annular spaces may therefore be contained in an outer annular region of the vapor-liquid contacting apparatus 100 that surrounds the vortex contacting stages as described herein.

FIG. 4 more clearly illustrates the flow of vapor through vortex contacting stages 10. In particular, vapor exiting vortex contacting zone 15 flows through inlet surface 31 of vapor-liquid disengagement device 30 and carries entrained liquid. Disengaged vapor, having a substantially reduced content of entrained liquid, then emerges from this device 30 predominantly through external outlet surface 32 that opposes inlet surface 31 and has a larger diameter than inlet surface 31 (e.g., with the opposing surfaces 31, 32 being concentric, inner and outer surfaces of a ring-shaped vapor-liquid disengagement device 30). External outlet surface 32 of vapor-liquid disengagement device 30 is in fluid communication with vapor inlet 22 of the immediately superior or higher vortex contacting stage 10.

Aspects of the invention are associated with the use of liquid downcomers as described above for the effective transfer of liquid exiting a vortex contacting stage to the proper contacting zone, namely that of the immediately inferior stage of the apparatus. In general, any entrained fraction of vapor bubbles in liquid withdrawn from a vortex contacting stage can create a tendency for flooding. To counteract this potential flooding tendency, the pipe or channel of a liquid downcomer that allows disengaged liquid to flow from a vortex contacting stage to an immediately inferior stage below must be sized large enough for self-venting flow. Suitable sizing correlations are found, for example, in Sewell, A., "Practical Aspects of Distillation Column Design", THE CHEMICAL ENGINEER, 299/300: 442 (1975), which can be used to predict the minimum required mean hydraulic diameter for the desired, self-venting flow.

In addition to proper downcomer sizing, the routing of liquid from stage to stage is further complicated by the fact that the axial symmetry of a vapor-liquid contacting apparatus and its vortex contacting stages device should be preserved to allow formation and maintenance of stable vortices.

Moreover, the channels of liquid downcomers for passing liquid to successive contacting stages should ideally disperse this liquid uniformly around the vortex perimeter through liquid inlets at each stage. Enhancing symmetry advantageously provides stable operation over a wider range of flow ratios, relative to cases in which liquid enters a vortex contacting zone in a non-uniform manner about its central axis. Another consideration from a mechanical perspective is the avoidance of piping for disengaged liquid that exits and re-enters the vertical, cylindrical shell of a typical vapor-liquid contacting apparatus, as such external piping requires significant installation labor and cost.

The external annular downcomers 35 illustrated in FIGS. 2-5 advantageously address these considerations associated with the transfer of liquid in vapor-liquid contacting apparatuses with multiple vortex contacting stages. In operation, disengaged liquid is collected from the outer surfaces 24, which are often curved, external to vortex contacting zones 15 and drains into an annular region or space disposed around the outside of these zones. Downcomers 35 extending in this space from various vortex contacting stages transfer disengaged liquid to the appropriate vortex contacting stage immediately below and preferably through liquid inlets disposed in a symmetrical manner about the central axis of vortex contacting zone 15, which is often the central axis of the vapor-liquid contacting apparatus itself.

Figure 5:
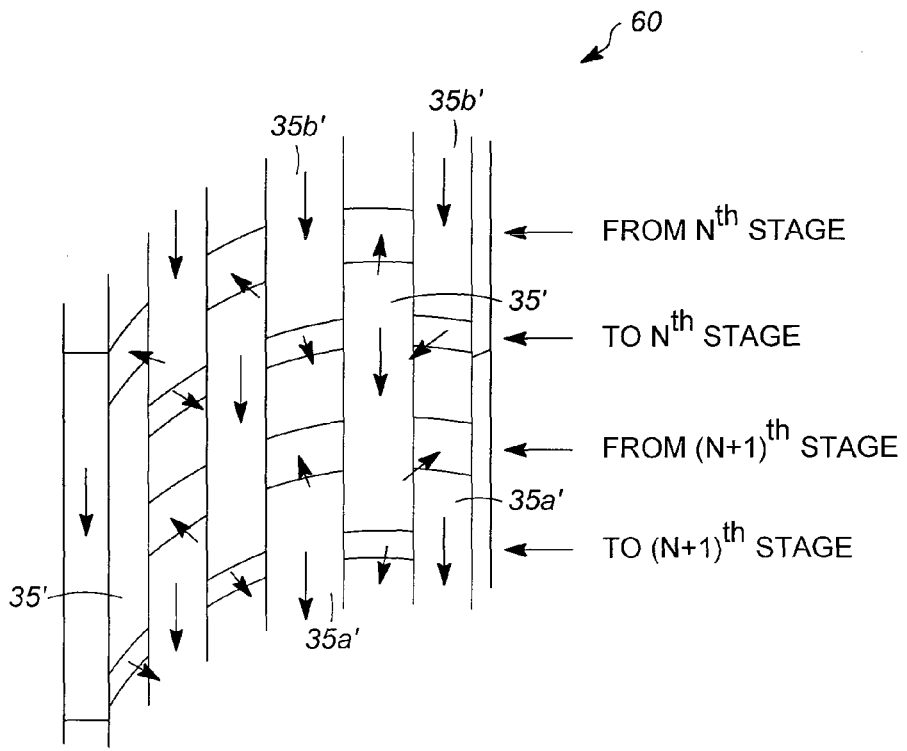
FIG. 5 depicts liquid downcomer segments extending in sections of an annular space that is external to vortex contacting stages, with the liquid flow directions shown.

Therefore, the outer surface of a given vortex contacting stage, which provides a flow path for disengaged liquid exiting a vapor-liquid disengaging device as discussed above, can terminate at a plurality of liquid downcomer segments extending in discreet radial sections disposed in an annular space external to the plurality of vortex contacting stages. As shown in FIGS. 2-5, the bottom of the liquid downcomer 35 extends below the top of the liquid downcomer 35a of an immediately inferior contacting stage. Therefore, as illustrated in FIG. 5, the annular space 60 can be divided into segments with alternating downcomers. In particular, liquid downcomer segments 35' of a given contacting stage that extend in discreet, radially spaced apart sections of the annular space 60 are disposed radially between liquid downcomer segments 35a' of the immediately inferior vortex contacting stage and liquid downcomer segments 35b' of the immediately superior vortex contacting stage. Horizontal arrows in FIG. 6 illustrate the representative horizontal levels at which liquid exits from, and enters into, the $N^{th}$ and $N+1^{th}$ contacting stages.

In an alternative embodiment, a series of pipes could replace the downcomer segments in the annular space, with the pipes being disposed inside the vertical wall of a vapor-liquid contacting apparatus. The use of pipes, however, provides reduced flow area (and thus may require a larger overall vessel diameter) and can also result in more complex fabrication (e.g., additional welding). However, pipes can also more effectively provide a liquid seal at the wall and mitigate potential concerns with respect to liquid leakage to the immediately inferior vortex contacting stage. Those having skill in the art and knowledge of the present disclosure will appreciate the tradeoffs between using pipes or annular downcomer segment for any given vapor-liquid contacting application.

In another specific embodiment, mechanical stresses, on the vessel caused by the torque of swirling internal fluids are reduced by reversing the direction of swirl on alternating vortex contacting stages. The torques from alternating stages thereby effectively cancel each other, and the reduction in overall stress allows for the use of thinner vessel walls for the vapor-liquid contacting apparatus vessel that reduce cost.

Overall, aspects of the invention are directed to vapor-liquid contacting apparatuses comprising a primary absorption zone and a secondary absorption zone comprising a plurality of vortex contacting stages disposed about a central region through which the primary absorption zone extends. Those having skill in the art will recognize the advantages of the apparatuses, vortex contacting stages, and associated methods described herein and their suitability in other applications. In view of the present disclosure, it will be appreciated that other advantageous results may be obtained. Those having skill in the art, with the knowledge gained from the present disclosure, will recognize that various changes can be made in the above apparatuses and methods without departing from the scope of the present disclosure. Mechanisms used to explain theoretical or observed phenomena or results, shall be interpreted as illustrative only and not limiting in any way the scope of the appended claims.

The invention claimed is:

1. A vapor-liquid contacting apparatus comprising:
   (a) a primary absorption zone, and
   (b) a secondary absorption zone comprising a vortex contacting stage, the vortex contacting stage comprising:
      (i) a vortex contacting zone,
      (ii) a vapor inlet in communication with the vortex contacting zone through a tangential flow directing device,
      (iii) a liquid inlet in communication with the vortex contacting zone, and
      (iv) a vapor stage outlet in fluid communication with a vapor stage inlet of a superior vortex contacting stage or a vapor product outlet of the apparatus, and a liquid stage outlet in fluid communication with a liquid stage inlet of an inferior vortex contacting stage or a liquid product outlet of the apparatus, wherein the primary absorption zone has a cross section within a cross section of the vortex contacting zone and wherein said vapor-liquid contacting apparatus further comprises a vapor feed inlet and a liquid feed inlet wherein the vapor feed inlet and a primary absorption zone liquid outlet communicate with a lower section of the primary absorption zone and the liquid feed inlet and a primary absorption zone vapor outlet communicate with an upper section of the primary absorption zone.

2. The apparatus of claim 1, wherein the primary absorption zone liquid outlet communicates with both the lower section of the primary absorption zone and a top vortex contacting stage of the secondary absorption zone and wherein the primary zone vapor outlet communicates with both the upper section of the primary absorption zone and a bottom vortex contacting stage of the secondary absorption zone.

3. A method for contacting a vapor and a liquid, the method comprising:
   (a) feeding, to the vapor-liquid contacting apparatus of claim 1, an impure vapor and fresh absorbent,
   (b) contacting the impure vapor and the fresh absorbent in the primary absorption zone and then in the secondary absorption zone, and
   (c) removing, from the vapor liquid contacting apparatus, a purified vapor from a vapor product outlet and a spent absorbent from a liquid product outlet.

4. The method of claim 3, wherein, during contacting in the primary and secondary absorption zones in step (b), overall flow of the vapor is upward and overall flow of the liquid is downward.

5. The method of claim 4, wherein step (b) comprises:
   (i) removing (I) a primary absorption zone vapor effluent from an upper section of the primary absorption zone and (II) a primary absorption zone liquid effluent from a lower section of the primary absorption zone, and (ii) passing (I) the primary absorption zone vapor effluent from the upper section of the primary absorption zone to bottom vortex contacting stage of the secondary absorption zone and (II) the primary absorption zone liquid effluent from the lower section of the primary absorption zone to a top vortex contacting stage of the secondary absorption zone.

6. The method of claim 3, wherein, in step (a), the impure vapor and the fresh absorbent are fed, respectively, to a lower section and an upper section of the primary absorption zone, and wherein, in step (c), the purified vapor and the spent absorbent are removed, respectively, from a top vortex contacting stage and a bottom vortex contacting stage of the secondary absorption zone.

7. The method of claim 3, wherein the impure vapor comprises predominantly methane and further comprises $CO_2$.

8. The method of claim 7, wherein the impure vapor further comprises $H_2S$.

9. The method of claim 3, wherein the fresh absorbent comprises an organic amine.

* * * * *